United States Patent [19]

Whitehouse

[11] Patent Number: 4,522,550
[45] Date of Patent: Jun. 11, 1985

[54] DETACHABLE PLATFORM FOR TRUCK BODY OR TRAILER

[76] Inventor: David N. Whitehouse, 1542 Woodland, Montreal, Quebec, Canada

[21] Appl. No.: 519,726

[22] Filed: Aug. 2, 1983

[30] Foreign Application Priority Data

Aug. 3, 1982 [CA] Canada .................................. 408623

[51] Int. Cl.³ .............................................. B60P 1/64
[52] U.S. Cl. ......................................... 414/498; 254/47
[58] Field of Search ..................... 414/498; 254/45, 47

[56] References Cited

U.S. PATENT DOCUMENTS

| | | | |
|---|---|---|---|
| 3,063,667 | 11/1962 | Doty et al. ........................... | 248/150 |
| 3,362,552 | 1/1968 | Thiele .................................. | 414/469 |
| 3,430,793 | 3/1969 | Chapman ............................. | 254/45 |
| 3,485,479 | 12/1969 | Baker ................................. | 254/47 X |
| 3,520,433 | 7/1970 | Blackburn .......................... | 414/498 |
| 3,598,261 | 8/1971 | Anderson ........................... | 414/498 |
| 3,632,072 | 1/1972 | Blackburn .......................... | 248/150 |
| 3,701,510 | 10/1972 | Logan ................................. | 254/47 |
| 3,719,299 | 3/1973 | Oehler ................................ | 414/495 |
| 3,722,721 | 3/1973 | Bennett ............................... | 414/498 |
| 3,737,061 | 6/1973 | Glumac .............................. | 414/495 |
| 3,995,760 | 12/1976 | Burgdorf et al. ................... | 414/498 |
| 4,042,138 | 8/1977 | Arvidsson ....................... | 414/498 X |
| 4,076,299 | 2/1978 | Dalton ................................ | 296/35 |

Primary Examiner—Robert J. Spar
Assistant Examiner—Ken Muncy
Attorney, Agent, or Firm—Larson and Taylor

[57] ABSTRACT

A detachable platform for supporting a container or the like has extensible legs to stand on the ground and permit a truck body or trailer to pass beneath the platform between the legs and has a built-in jacking system that raises the platform off a truck body or trailer to allow the legs to be extended. The platform permits standard truck bodies and trailers to be used with standard containers without external cranes or lifting devices and avoids the necessity of leaving a container sitting on a truck or trailer.

5 Claims, 11 Drawing Figures

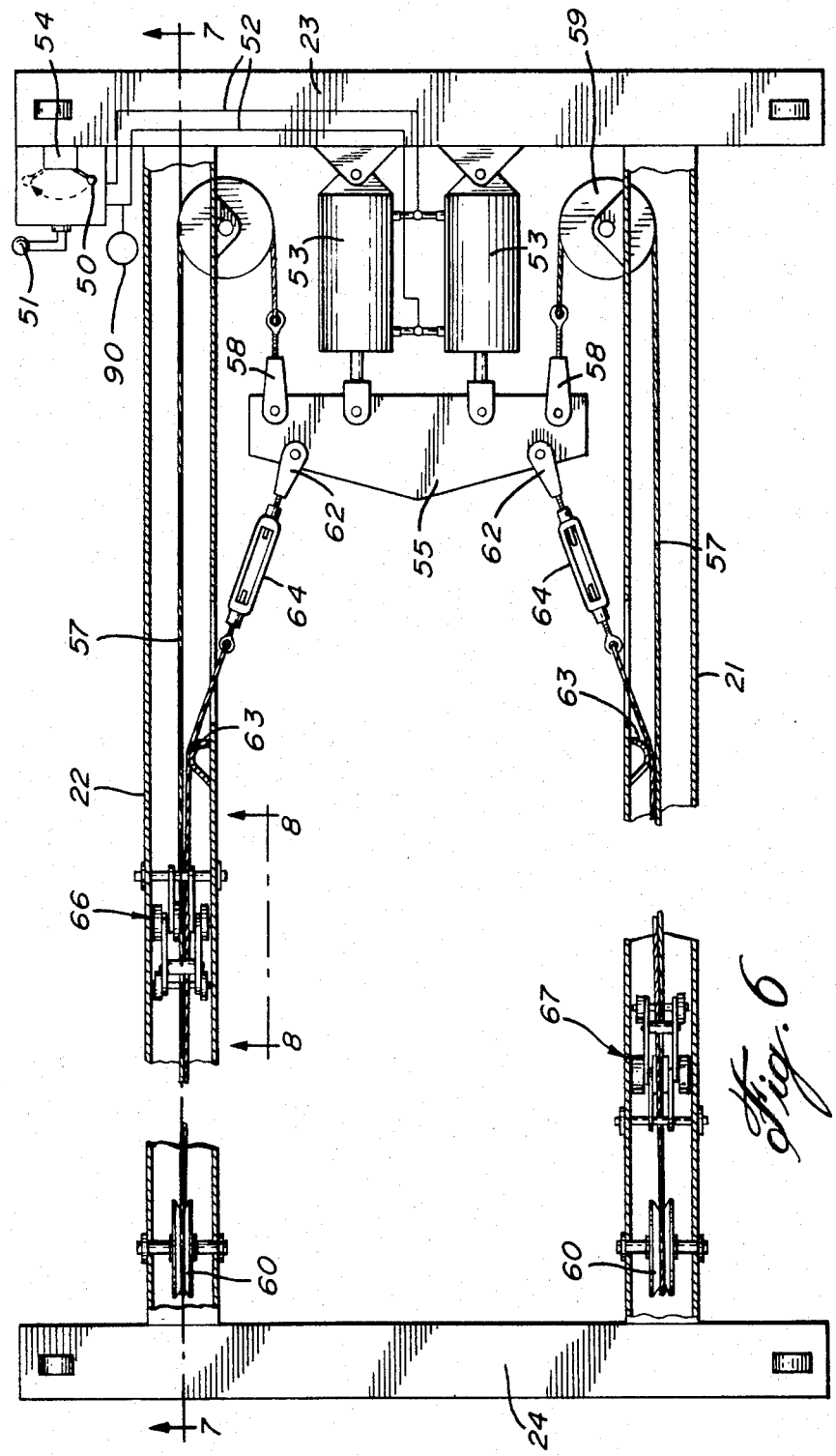

DETACHABLE PLATFORM FOR TRUCK BODY OR TRAILER

This invention relates to platforms for cargo containers and the like. More specifically, the invention relates to a platform which supports a cargo carrying container and has retractable legs to stand on the ground or may be detachably mounted on a truck body or trailer.

Portable cargo containers are generally shipped on flat bed semi-trailers from one point, such as a container terminal, to a required destination. Once the container and trailer have left the terminal, they generally remain together until they return to the terminal where crane facilities are available to remove the container from the trailer. Thus, if it takes some time to unload the container, the trailer has to remain merely as a platform to support the container. Such use is uneconomical and there is a need for a way of separating the container from the trailer without elaborate lifting equipment, special containers or trailers.

In the past, attempts have been made to make special containers with retractable legs. Another concept has been to make a separate platform which supports the trailer, however, these separate platforms have to be jacked up by a jacking system integral with the truck or trailer, and thus it constitutes a specially modified truck or trailer necessary to transport the cargo container.

The aim of the present invention is to provide a simple detachable platform which has retractable legs and can support a cargo container or the like. The retractable legs allow the platform to rest on the ground, thus supporting the container in the raised position. The platform also has a special jack mechanism formed integral therewith, and allows a standard truck body or semi-trailer to be driven underneath the platform between the legs, and the jack mechanism allows the platform to be lowered onto the truck body or trailer. Thus, a standard truck body or trailer can be used to load and unload a standard container. This allows the truck or the trailer to deposit the container in any location. The container can be unloaded at leisure and the truck or the trailer can be used for transportation of other containers.

Thus, the present invention provides a platform for supporting a container or the like, which frees the use of a truck or trailer when the container has to be left either in storage or in an unloading area, and yet which requires no additional cranes or special lifting equipment attached to either the container or the trailer. The platform itself has a special jack integral therewith which permits the container to be lifted off the truck or trailer, and has retractable legs which can be lowered to support the container so that the truck or trailer can be removed.

The present invention provides a detachable platform for supporting a container or the like, the platform adapted for detachable mounting on a truck body or trailer, comprising a substantially flat frame assembly, having at least two longitudinal structural beams, at least four support legs mounted on the frame assembly, each leg having at least one extension member with a support pad at the base thereof, and a horizontal side extension portion at the top of the extension member, to extend the legs outboard of the frame assembly and permit the truck body or trailer to pass between the legs and under the frame assembly, a manual jacking means integral with the frame assembly having at least four jacking points for positioning on the truck body or trailer to raise the platform off the truck body or trailer and permit the legs to be extended outboard and lowered.

In embodiments of the invention, the support legs on each side of the frame slope outwards at an angle of about 5° to the vertical, the two longitudinal structural beams of the detachable platform are hollow, and the jacking means includes at least one double acting hydraulic jack having a piston connected to two cable means, each cable means connected at each end to the piston, passing around sheave means at each end of the hollow beam of the frame assembly, including tension means to retain tension in the cable means, linkage means at each jacking point connected to one of the cable means such that movement of the cable means by the jack raises or lowers the platform from the jacking points. The tension means to retain tension in the cable means is a turnbuckle.

In other embodiments the horizontal side extension portion of each leg is a round tube and allows the leg to pivot in a fixed round tube attached to the frame assembly. A first locking means may be provided at each corner of the platform between the platform and a container and the like, and a second locking means at each corner of the platform between the platform and the truck body or trailer. The jacking means may include at least four individual jacks integral with the jacking points.

In drawings which illustrate the embodiments of the invention,

FIG. 6 is a top plan view of the detachable platform showing the cables and jacking system.

FIG. 7 is a partial sectional view taken at line 7—7 of FIG. 6.

Figure 1:
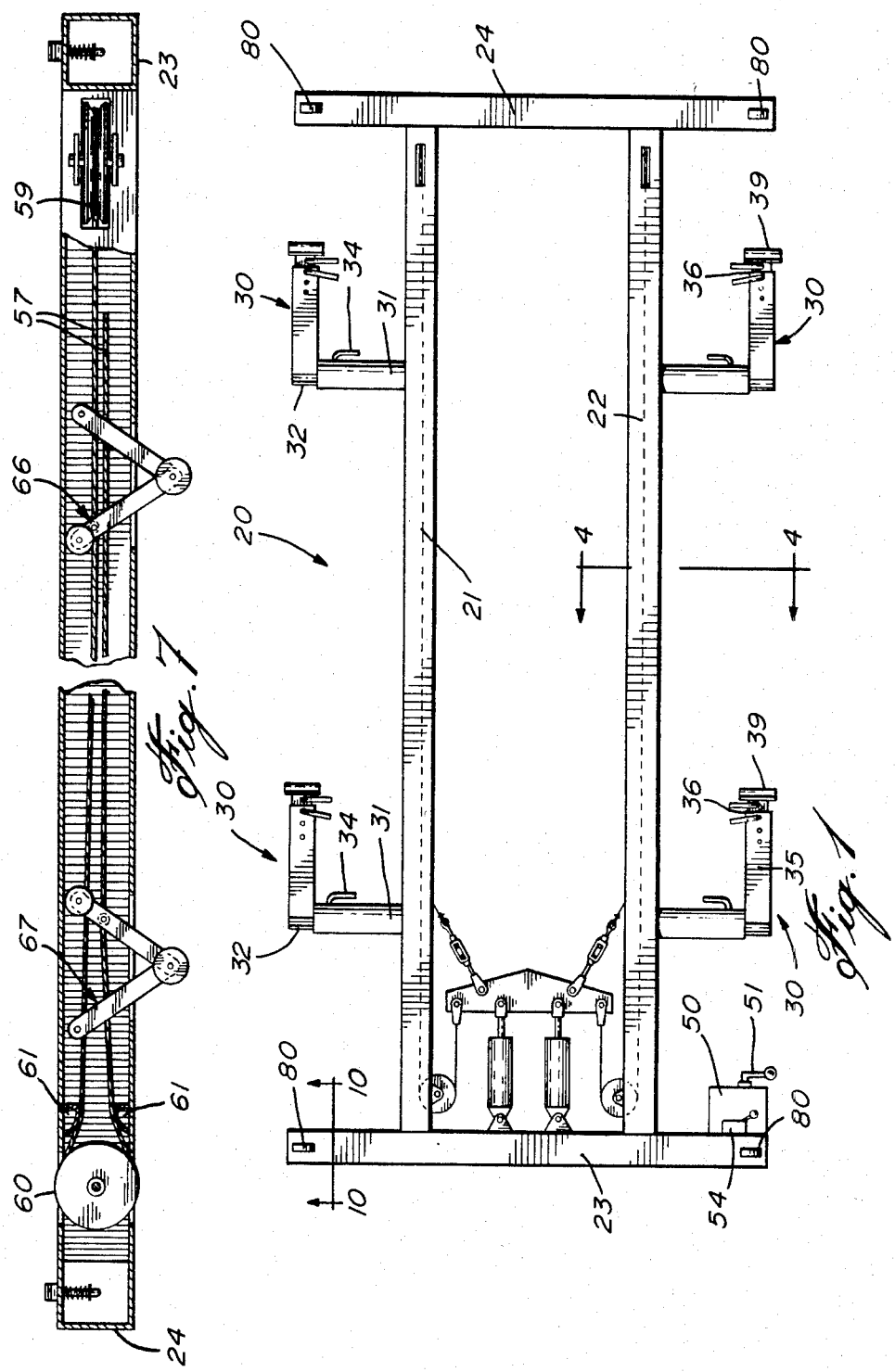
FIG. 1 is a top plan view showing one embodiment of the detachable platform of the present invention.
Figure 2:
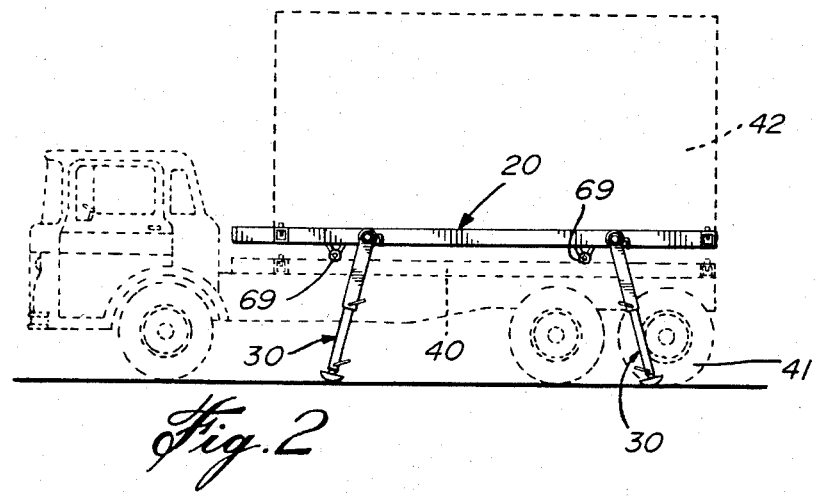
FIG. 2 is a side view of the platform shown in FIG. 1 mounted on a semi-trailer and supporting a container.
Figure 3:
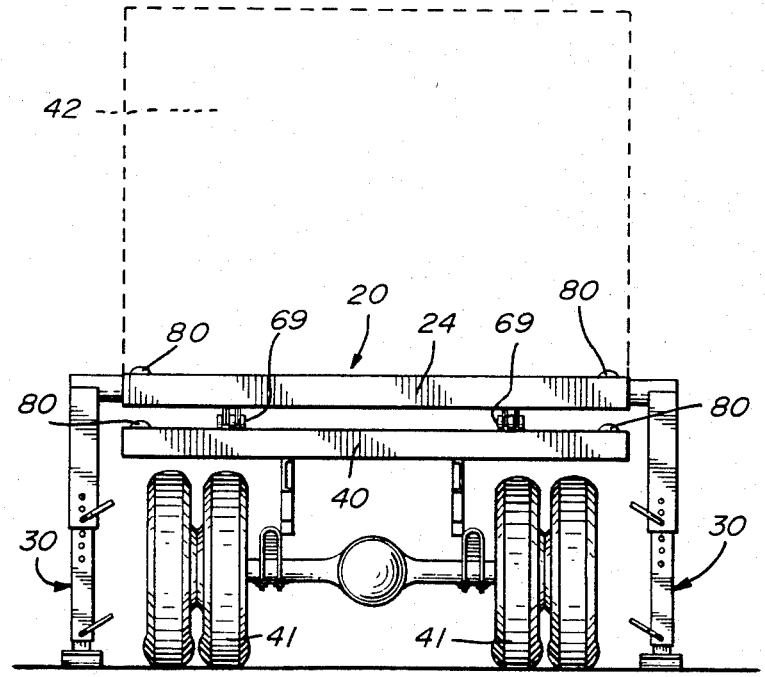
FIG. 3 is an end view of the platform and trailer shown in FIG. 2.

Referring now to FIGS. 1, 2 and 3 a detachable platform 20 is shown having a substantially flat frame with two longitudinal structural beams 21 and 22 extending from end to end. The beams 21 and 22 are connected to a front lateral member 23 and a rear lateral member 24. In the embodiment shown, the longitudinal structural beams 21 and 22 and the lateral members 23 and 24 are all made from square tubular steel, although other structural sections may be used in forming the frame. Furthermore, additional lateral beams may be provided between the two longitudinal structural beams 21 and 22 particularly where such beams are necessary to support the container or to strengthen the frame assembly.

Figure 4:
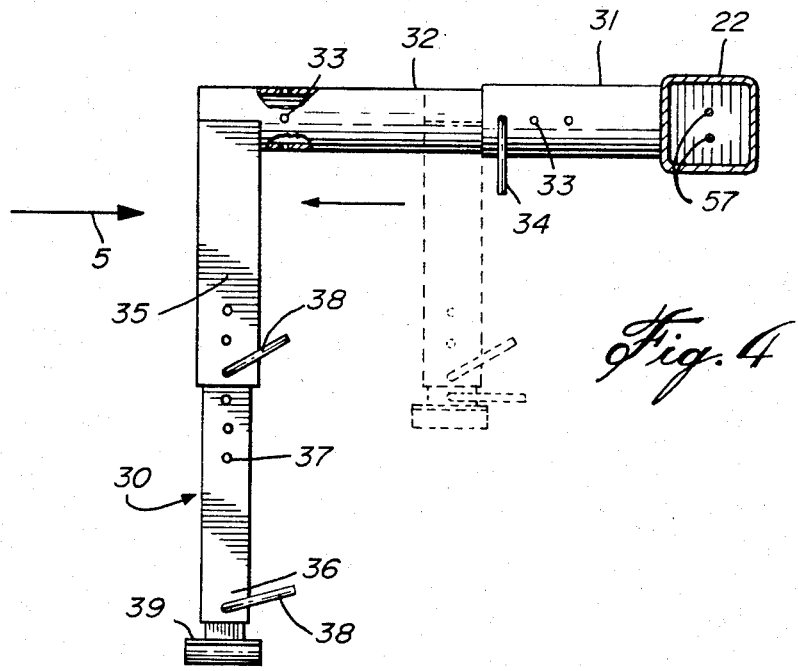
FIG. 4 is a partial sectional view taken at line 4—4 of FIG. 1.
Figure 5:
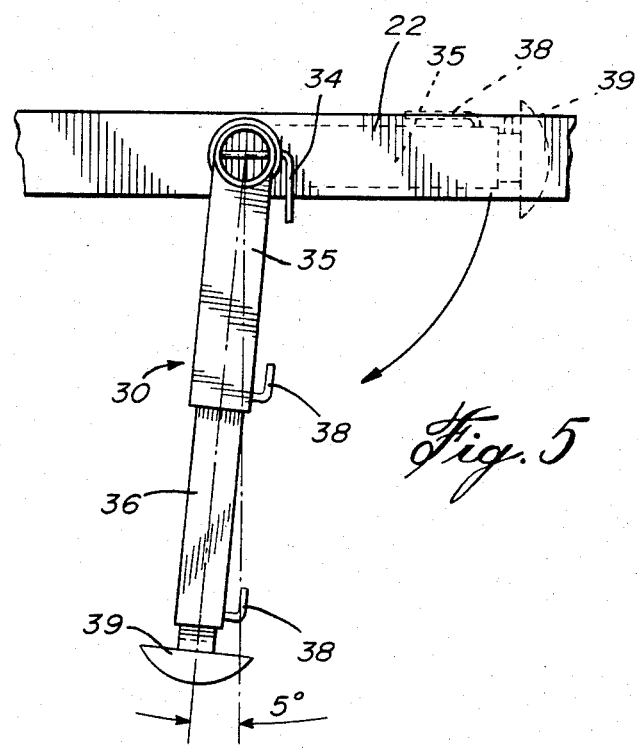
FIG. 5 is a partial side view taken at arrow 5 of FIG. 4.

As shown in FIGS. 4 and 5, four support leg assemblies 30 are provided on the platform. Each leg assembly 30 is substantially the same and includes a horizontal round tubular member 31 rigidly attached to one of the structural beams 21 or 22. The type of attachment is preferably a welded connection and although not shown the member 31 may extend between the two structural beams 21 and 22 to provide a more rigid support. At the end of each of the fixed horizontal tubular members 31 is an opening to allow a round tubular side extension portion 32 to slide therein and holes 33 are provided in the fixed member 31 to coincide with holes in the extension portion 32 so that a locking pin 34 can be inserted to lock the two units together. The extension portion 32 may be rotated through 95° in the fixed member 31 and then locked in that position by the pin 34 being inserted through the appropriate holes 33 so that the leg assembly slopes outwards at an angle of about 5° to the vertical.

A vertical fixed member 35 is rigidly attached to the end of the horizontal extension portion 32. The vertical fixed member is formed of a square tubular section and has a telescopic extension member 36 also formed of a square tubular section which slides into the vertical fixed member 35. In the embodiment shown, a further telescopic extension member slides into the first extension member 35. Holes 37 are provided in the vertical fixed member 36 and the extension member 36, and pins 38 lock the members together so that the leg is at the desired height. A support pad 39 with a curved under surface is provided at the base of the extension member. The support pad 39 may be permanently attached to the lowest extension member or may be a separate unit. If a separate unit is provided, it may have a large area for spreading the load when the container stands on soft surfaces such as asphalt on a hot day. FIG. 1 shows the support leg assemblies 30 in the stored position. The leg assembly remains in this position when the platform 20 rests on a truck or trailer. The horizontal extension portion 32 is pushed in to the maximum extent and the vertical extension member 35 is telescoped up to its top position. The pins 34 and 38 are then pushed through the appropriate holes 33 and 37 to lock the assembly in place.

As shown in FIGS. 2 and 3, the leg assembly is in the lowered position, so that the platform may be supported on the support pads 39. The horizontal extension portion 32 is pulled out as far as possible and rotated so that the vertical fixed member 35 is sloping outwards at an angle of about 5° to the vertical. The extension portion 32 is then locked in place by the pin 34 being pushed through the appropriate hole 33. The vertical extension member 36 is lowered to the required extent and the pin 38 inserted through the appropriate hole 37. A number of holes 37 are provided so that the platform 20 may be supported on uneven ground and still remain substantially horizontal.

FIGS. 2 and 3 illustrate a semi-trailer 40 located under the platform 20. As may be seen in FIG. 3 the wheel assemblies 41 pass between the legs 30 of the platform. A container 42 is shown mounted on the platform 20.

The detachable platform 20 has integral therewith a built-in jacking system to raise the platform 20 off a trailer 40. The operating mechanism for the jacking system shown in FIGS. 6 and 7 has a standard hydraulic jack pump 50 located at the front side of the platform, mounted on the front lateral member 23. The jack pump 50 is a double acting pump operated by a reciprocating handle 51. Two hydraulic pipes 52 from the jack pump 50 lead to two hydraulic cylinders 53, one pipe 52 feeding to one end of each cylinder 53 and the other pipe 52 to the other end. A control lever 54 positioned on the jack pump 50 selects whether the cylinder pistons are moving inwards or outwards. A moveable plate 55 is attached to the two cylinder pistons and moves backwards and forwards when the jack pump 50 is activated depending upon the position of the control lever 54. A jacking cable system 57 is attached to each side of the moveable plate 55 inside the hollow structural beams 21 and 22. Details of the cable system 57 are illustrated in FIG. 7. One end of the cable has a wire attachment 58 to the cylinder side of the moveable plate 55 outboard of the hydraulic cylinders 53, the wire passes around a sheave 59 and passes the length of the structural beam 21, 22 around a second sheave 60, assisted by guides 61 and then exits out of an access in the side of the structural beam to a wire attachment 62 on the other side of the moveable plate 55. A wear plate 63 at the edge of the access in the beam prevents wear of the cable, and a turnbuckle 64 allows a tension to be maintained in the cable. When the moveable plate 55 is moved the cable assembly 57 moves backwards and forwards in the structural beams 21, 22.

Figure 8:
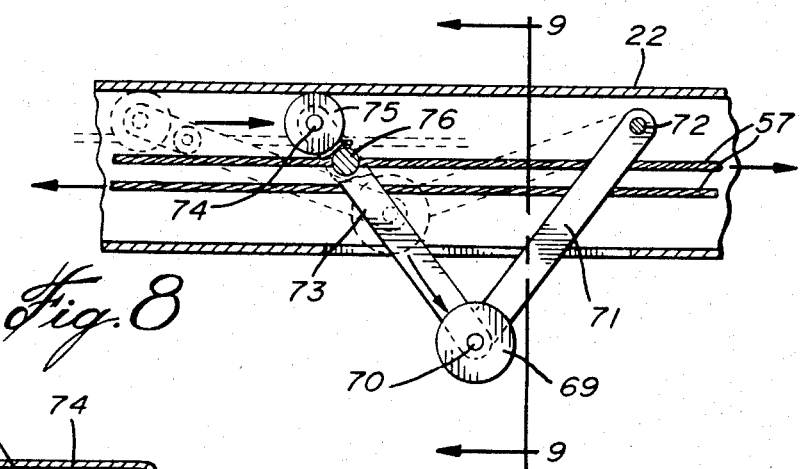
FIG. 8 is a partial sectional view taken at line 8—8 of FIG. 6.
Figure 9:
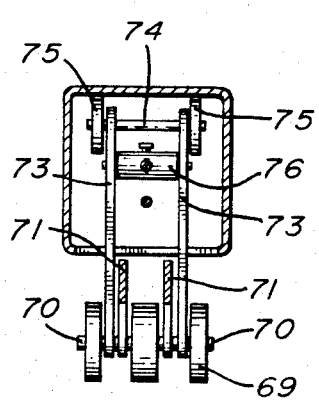
FIG. 9 is a sectional view taken at line 9—9 of FIG. 8.

Each cable assembly is connected to a front linkage system 66 and a rear linkage system 67. Details of a front linkage system 66 is shown in FIGS. 8 and 9 wherein rollers 69 act as jacking points and have an axle 70 passing therethrough which has a first set of links 71 connecting the axle 70 to a pin 72 which is fixed to the beam 22. A second set of links 73 connects the roller axle 70 to a guide roller axle 74 at the top with guide rollers 75 to move backwards and forwards on the top inside surface of the beam 22. A cable clamp 76 clamps the second set of links onto the cable from the sheave 59, so that when the cable moves towards the sheave 59 the rollers 69 lift up the beam 22. The rear linkage system 67 works in the same manner except the other cable is clamped to the second set of links, so the guide rollers 75 are moved in the other direction. This prevents the whole platform from moving forward or backwards when jacking occurs.

Whereas rollers are shown, pads may be used, or an arrangement of rollers and pads. The sloped leg assemblies prevent the platform from rolling off a trailer because the pads on the bottom of the leg tend to push up and act as brakes to prevent movement.

Figure 10:
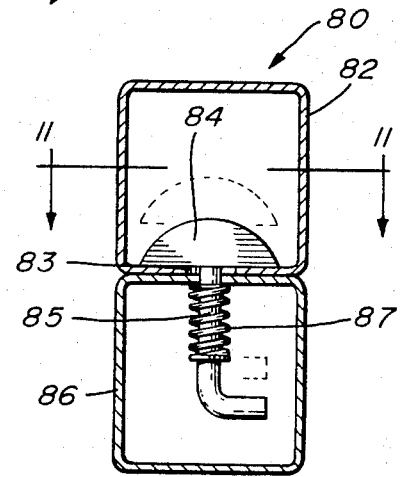
FIG. 10 is a sectional view taken at line 10—10 of FIG. 1.
Figure 11:
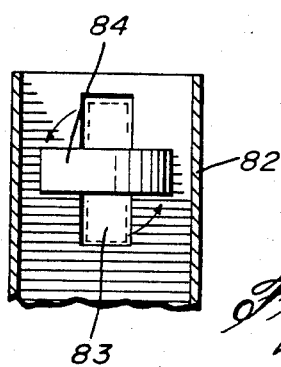
FIG. 11 is a sectional view taken at line 11—11 of FIG. 10.

To ensure the platform 20 rests on the truck body or semi-trailer 40, as shown in FIG. 2, locking devices are provided in each corner of the platform 20. Examples of these locking devices 80 are illustrated in FIGS. 10 and 11. The locking devices 80 are provided between platform 20 and the trailer 40, also between the platform 20 and the container 42. As shown in FIG. 10 the top member 82 has a longitudinal slot 83 in the lower surface which allows a semi-circular locking disc 84 to pass therethrough. The locking disc 84 has a rod 85 extending down through the top surface of a lower structural member 86. A spring 87 provides tension so that the locking disc 84 is continuously pressed against the lower surface of the top member 82. In operation, the locking disc 84 is rotated so that it is in the same direction as the slot 83. The top member 82 lowered onto the bottom member 86 so that the locking disc 84 passes through slot 83 and the locking disc 84 is then raised and turned through 90° so that it locks the top member 82 to the bottom member 86. This locking device is one of many such devices that can be utilized between the platform and the container, or the platform and the truck body or trailer.

The platform 20 of the present invention may be used in a number of ways. Initially, it is first placed onto a semi-trailer or truck body, the jacking rollers 69 are raised to their top position by activating the jack pump 50. The leg assemblies 30 are initially in the stored position. The platform is locked to the trailer by locking devices 80 and a container or other cargo unit is placed onto the platform 20 and top locking devices are used to lock it in place. The trailer may then be used to move the container and platform to wherever is desired. When it reaches its destination, the jack pump 50 is manually operated by the lever 50 to raise the platform with the container on it, off the trailer on the rollers 69. The legs are then extended and lowered, the pins inserted so that the legs are locked in position. The jack pump 50 is reversed so that the platform lowers onto the four legs with the rollers 69 raised and the trailer no longer supports the platform. The trailer can then be driven out from between the legs leaving the container sitting on the platform which in turn is supported by the legs. If the container is left on uneven ground, then the legs can be lowered to different amounts, so the platform remains reasonably level. In one embodiment a pressure gauge 90 is incorporated into one of the hydraulic lines which can be calibrated to read in weight measurement to determine the weight on the platform.

Whereas a single jacking system is disclosed herein, it will be appreciated that four individual jacks could be located at each jacking point. The jacks are disclosed as being hydraulic, however, a mechanical type jack with appropriate linkage system could be incorporated, such as a screw-type jack. Platforms may be made for standard 20 ft long containers or for 40 ft long containers. If the platforms are made for the long containers, they may have six or eight jacking pads and leg assemblies.

Various changes may be made to the details of this detachable platform without departing from the scope of the invention which is only limited by the following claims.

The embodiments of the invention in which an exclusive property or privilege is claimed are defined as follows:

1. A detachable platform for supporting a container or the like, the platform being adapted for detachable mounting in a truck body or trailer, comprising
 a substantially flat frame assembly having at least two hollow longitudinal structural beams,
 at least four support legs mounted on the frame assembly, each leg having at least one extension member with a support pad at the base thereof, and a horizontal side extension portion at the top of the extension member, to extend the legs outboard of the frame assembly and permit the truck body or trailer to pass between the legs under the frame assembly,
 a self-contained jacking means integral with the frame assembly having at least four jacking points for positioning on the truck body or trailer to raise the platform in a single lift off the truck body or trailer and permit the legs to be extended outward and lowered the jacking means includes at least one double acting hydraulic jack having a piston connected to two connecting means, each connecting means being connected to the piston and to linkage means at each jacking point, such that movement of the connecting means by the jack raises or lowers the platform from the jacking point.

2. The detachable platform according to claim 1, wherein the support legs on each side of the frame slope outwards at an angle of about 5° to the vertical in a plane parallel to the longitudinal axis of the frame.

3. The detachable platform according to claim 1, wherein said connecting means comprises a cable means including a tension means to retain tension in the cable means, said tension means is a turnbuckle.

4. The detachable platform according to claim 1, wherein the horizontal side extension portion of each leg is a round tube and allows the leg to pivot in a fixed round tube attached to the frame assembly.

5. The detachable platform according to claim 1, including a first locking means at each corner of the platform between the platform and the container or the like, and a second locking means at each corner of the platform between the platform and the trucking body or trailer.

* * * * *